United States Patent Office 2,921,403
Patented Jan. 19, 1960

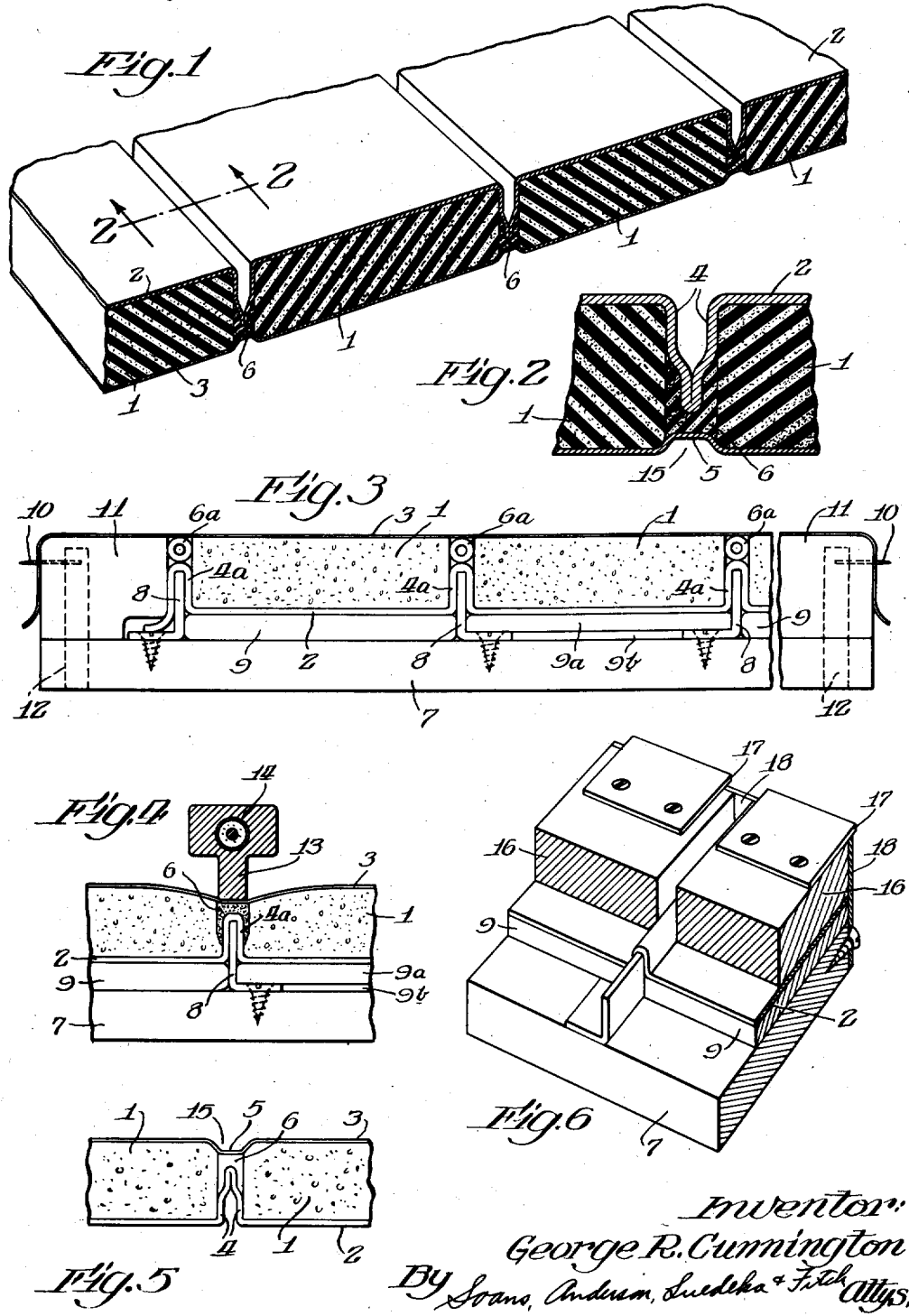

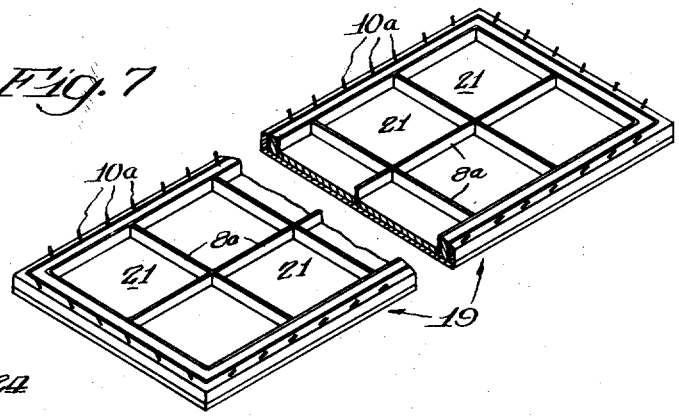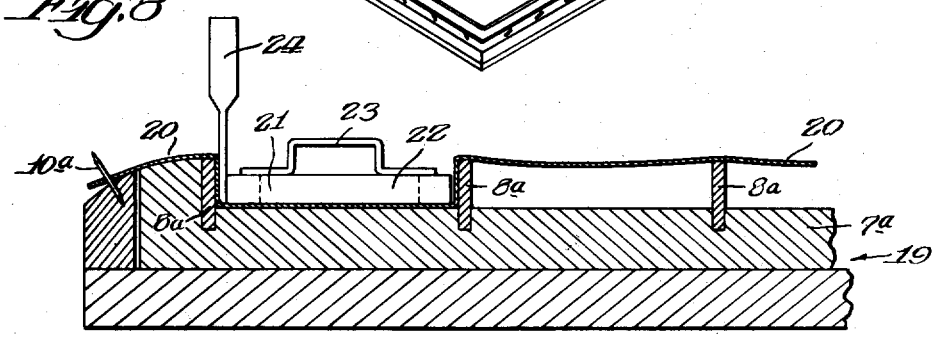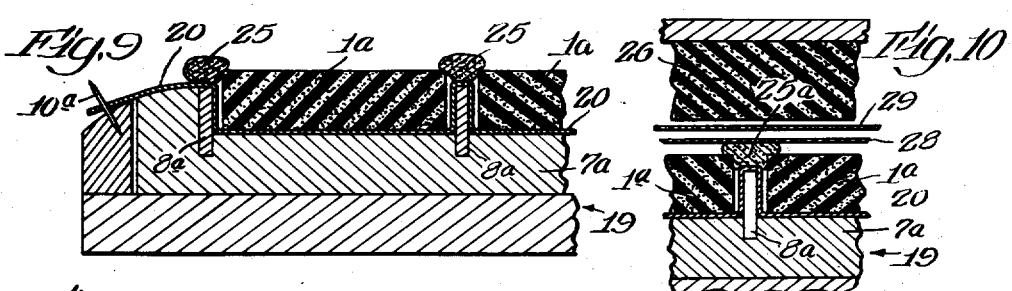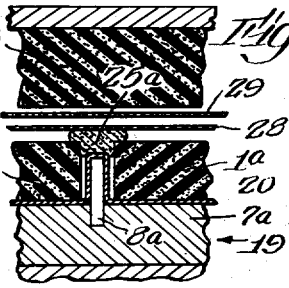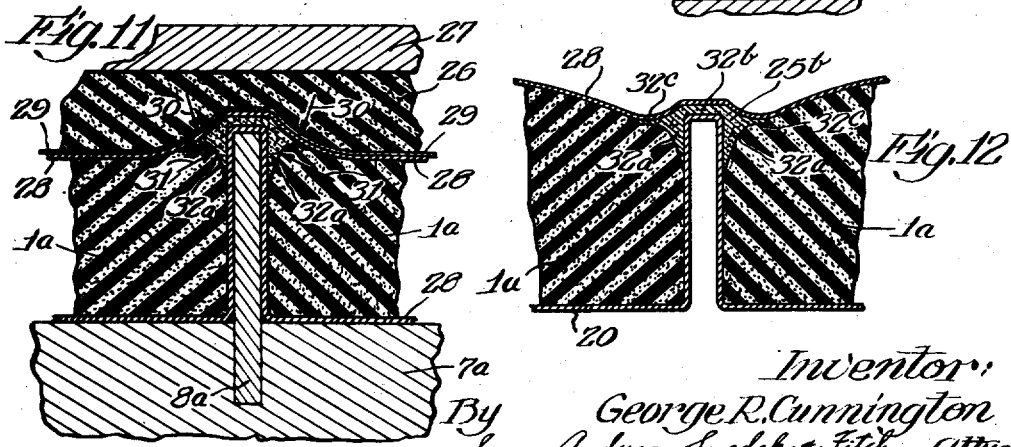

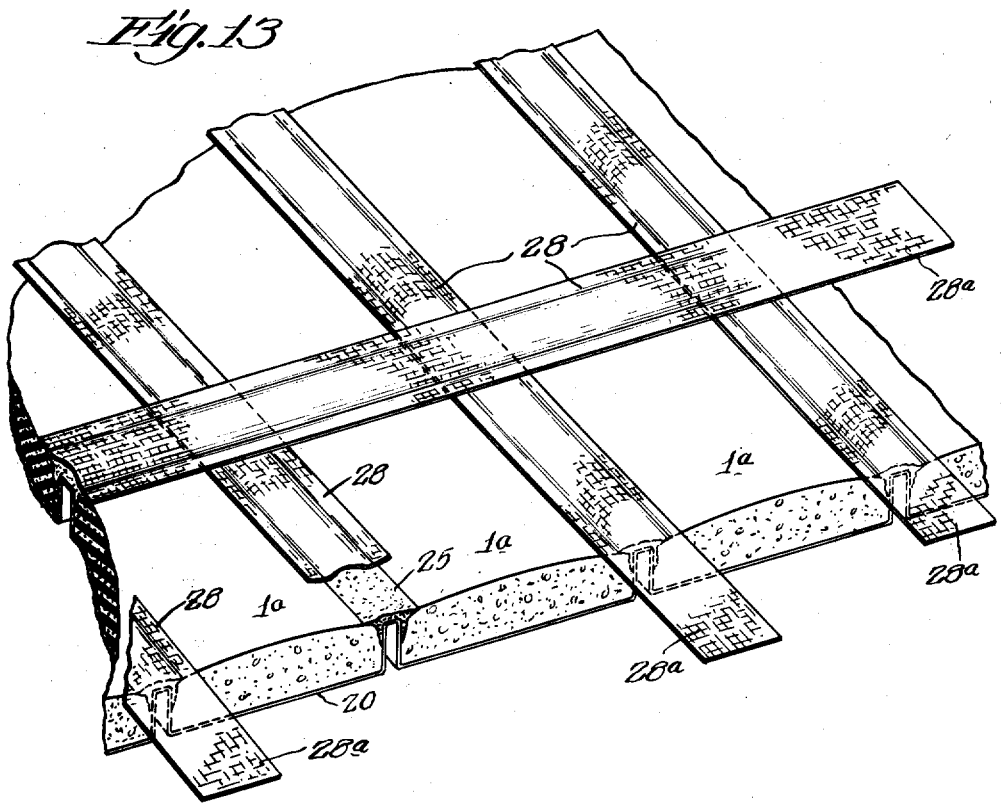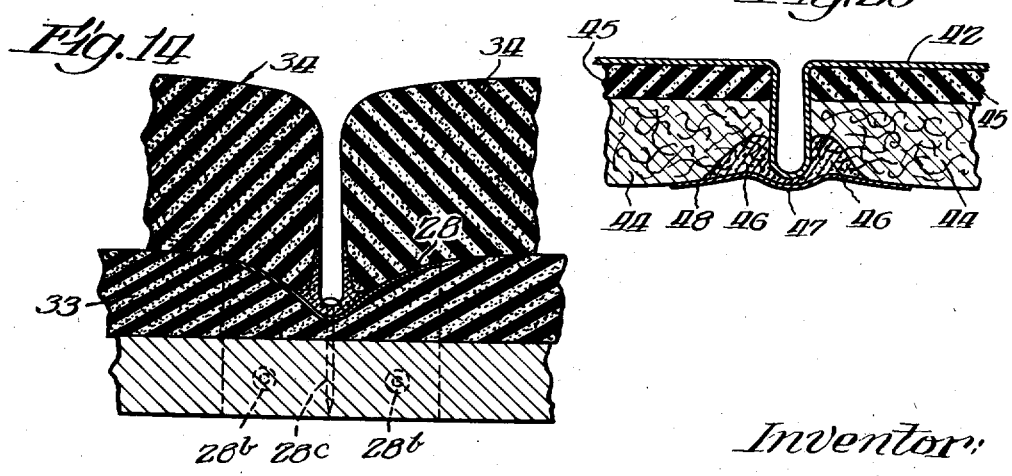

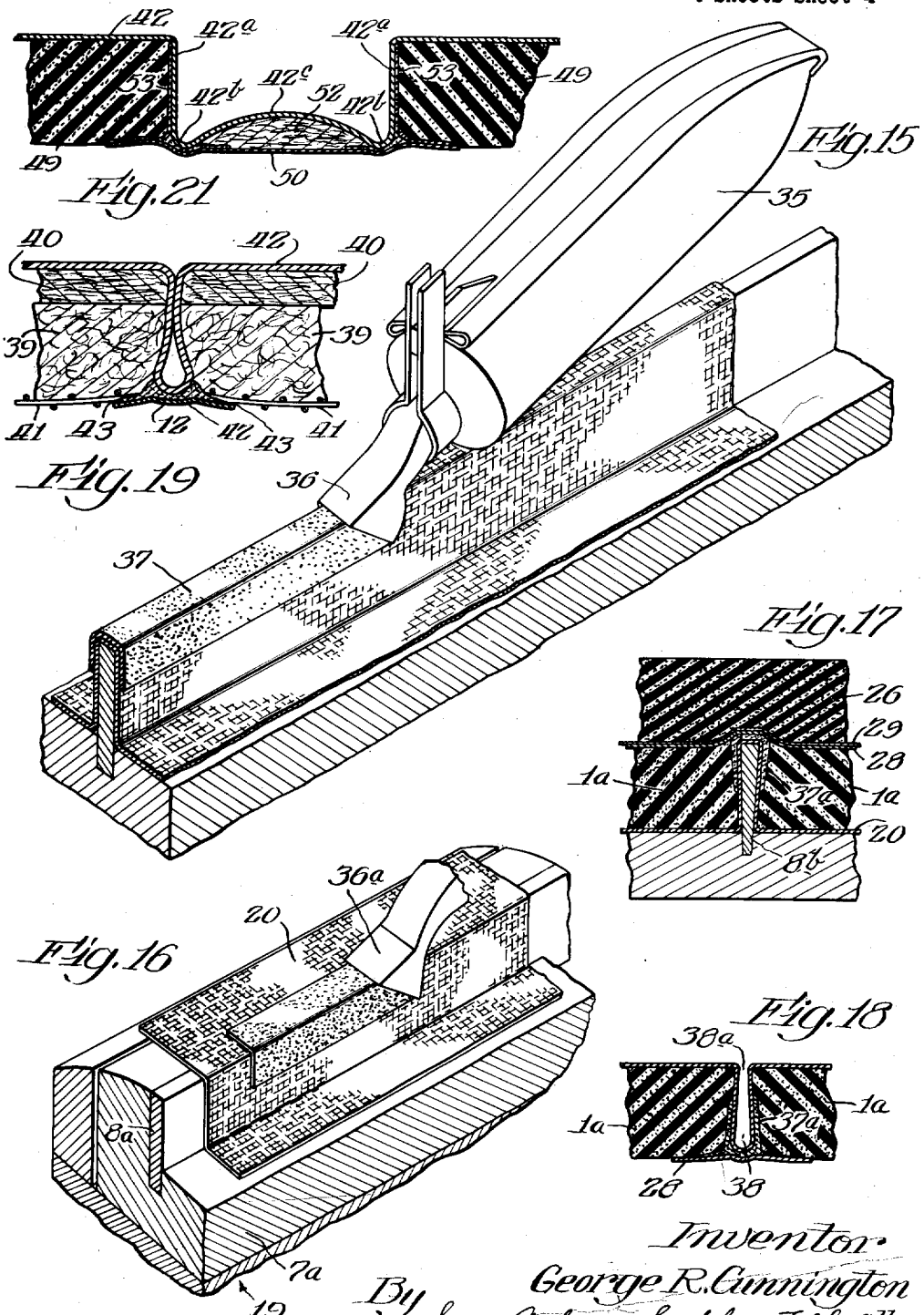

2,921,403

UPHOLSTERY MAKING

George R. Cunnington, San Mateo, Calif.

Application July 20, 1956, Serial No. 599,179

8 Claims. (Cl. 45—138)

This invention relates to improvements in upholstery, and more particularly to upholstery consisting of cushioning material and upholstery fabric covering the cushioning material. Such material is most commonly employed for upholstering chair seats and backs and the seats, backs, arms and parts of sofas and other items of furniture, automobile seat and backrest cushions and the like.

The main objects of the invention are to provide cushioned upholstery material in which the covering fabric or material is securely anchored to the cushion structure and in which the parts of the cushion structure comprising at least covering fabric and cushion or pad elements, and sometimes backing strips or sheeting, are united in such a manner as to incorporate in the cushion an attractive design feature which is permanently built into the cushion; to provide such a structure in which the design feature is incorporated in a manner to insure sharpness and uniformity in the design; to provide cushioned upholstery of great strength and durability, and uniform flexibility, without adding stiffness or harshness to the structure; to provide upholstery of the character indicated which can be fabricated economically and at low cost, and with relatively simple, inexpensive equipment; to provide upholstery material of the character indicated which may readily be attached to various seat, backrest and other structural shapes with a minimum of labor; to provide upholstery of the character indicated and a method of making the same, whereby an almost unlimited number of designs or patterns may be employed so as to permit variation of the cushion pattern in keeping with changing styles; to provide upholstery in which components are adhesively bonded together by bonding which resists deterioration and impairment by ordinary cleaning processes and by aging; and in general it is the object of the invention to provide an improved unit of upholstery and an improved method of making the same.

Other objects and advantages of the invention will be understood by reference to the following specification and accompanying drawings wherein there is illustrated a representative form of the improved upholstering material together with the method of producing the same.

In the drawings,

Figure 1 is a fragmentary perspective illustrating a section of the improved upholstering material;

Figure 2 is a section on an enlarged scale represented by a plane on the line 2—2 of Figure 1 illustrating the principal details of construction;

Figures 3, 4 and 5 are more or less schematic views illustrating various steps in the method of producing the material;

Figure 6 is a perspective illustration of a step of procedure in producing the improved material;

Figure 7 is a perspective illustration typifying a preferred form of die structure employed in making upholstery according to the invention;

Figure 8 is a fragmentary sectional view through a portion of the die structure shown in Figure 7 and illustrating certain preliminary steps in the production of the improved upholstery;

Figures 9, 10 and 11 represent successive steps in another method of producing the improved upholstery;

Figure 12 is a fragmentary sectional view through a portion of the upholstery produced by the method represented by Figures 9, 10 and 11;

Figure 13 is a perspective illustration of certain details of a unit of the improved upholstery;

Figure 14 is a fragmentary sectional view illustrating the application of the improved unit to a padded sofa seat or back;

Figures 15 and 16 are perspective illustrations of certain details of methods of applying bonding material;

Figure 17 illustrates a modified means and method for producing the improved upholstery;

Figure 18 illustrates the product produced by the means and method as shown in Figure 17; and Figures 19, 20 and 21 are cross sectional representations of certain modifications of the upholstery which may be made according to the present invention.

The improved upholstering material, as illustrated in Figures 1 and 2 comprises so-called foam rubber cushions or filler elements 1, an outer fabric cover 2 and an inner or lining fabric member 3. The cushion elements 1 are here represented as being in the form of elongated rectangular, bar-like sections, each being independent of the other and usually having been formed by cutting sections of the desired width from the end of a large sheet of the selected foam rubber or other resilient cushion material. The outer fabric covering 2 may be of woven textile material, leather, artificial or simulated leather or other suitable sheet material and the lining may also be of any suitable sheeting, for example, woven textile material. The outer covering 2 extends over one side of a plurality of cushion members 1 assembled in the required relation, and portions of such cover material extend into the spaces between adjacent cushion members 1 as indicated at 4 so as to cover such adjacent edges of the cushion members 1. These edge covering portions 4 which are more or less tucked in between the cushion members 1 as best shown in Figure 2, are bonded to portions 5 of the lining 3 by means of rubber or rubber-like bonding material 6 which presents a U-shaped cross section so that its parallel legs embrace a considerable portion of the width of the tucked-in fabric 4 and also about substantial portions of the widths of the adjacent faces of the cushion members 1 while the bottom of the U-shaped bonding material engages the lining material.

The bonding material 6 is preferably formed from rubber which is soft and resilient although usually somewhat more firm than the sponge or foam rubber members 1. This bonding member 6 is preferably formed of a rubber composition which is placed in position in an uncured state and subjected to treatment which causes the material to become bonded to the other components of the upholstery material while also being cured and stabilized.

One simple method of producing a cushion structure such as described is shown in Figures 3 to 5 inclusive. As there shown, a table top or suitable flat bed plate 7 is provided with a plurality of upstanding rib-like members 8 which, in this instance, are illustrated as being formed by vertically disposed legs of angle members which have horizontal legs secured to the plate 7. The legs or ribs 8 may be of a vertical dimension or width approaching but usually slightly corresponding less than the depth to which the fabric portions 4 are tucked between the cushion elements 1, but the equipment may be made flexible enough to permit production of upholstering with various thicknesses of cushion members 1 by making the said ribs 8 of a somewhat greater width and employing suitable filler members 9 between adjacent ribs 8 to provide effective recesses between the ribs 8 of the desired depth.

The filler member 9 may be made of a single thickness sheet as indicated in the left-hand portion of Figure 3. When the filler must fit the stepped bottom area which results from the use of angle type ribs or bars 8 as shown in the right-hand portion of Figure 3, the filler may conveniently be made in two sections 9a and 9b so as to avoid costly peripheral grooving of a single sheet structure to cause it to conform to the stepped bottom surface.

The outer or finishing fabric 2 is first placed over the top edges of the ribs 8 and then by suitable means is pressed down into the recesses so as to rest on the upper surfaces of the fillers 9 and to provide the portions indicated at 4a around the portions of the ribs which project above the fillers 9. When forming a cushion embodying a considerable number of parallel cushion members 1, it is usually advisable to lay the fabric 2 over the forming plate and to start forming such material into the recesses at about the middle of the length of the fabric and to progressively form the fabric section by section outwardly from the first formed section until the entire fabric is conformed to the face of the ribbed forming plate structure. This procedure facilitates gathering of the fabric to form the tuck portions 4a thereof.

After the fabric is conformed to the forming plate, the cushions 1 are positioned between the fabric tucks or folds 4a, the adjacent edges of the cushions being thereby spaced from each other a distance substantially corresponding to the combined thickness of the rib 8 and two plies of the fabric 2 which form the said tucks 4a.

In the space between adjacent cushions 1, a strip of rubber composition such as indicated at 6a is positioned, this strip being preferably of solid or tubular cylindrical form, depending upon the amount of material required, and preferably of a diameter which substantially corresponds to the space between the adjacent edges of the cushion members 1. Such a cylindrical strip of rubber composition 6a positions itself in centered relation to the ribs 8 and is not subject to tilted, unbalanced or unsymmetrical positions as are rectangular and most other cross sectional forms of bonding material.

The material of which the strips 6a is made is preferably a composition which, upon curling by heat will first become more or less liquid so as to flow by gravity, or under only light pressure and, also such that it will blow, i.e., become more or less porous and similar to sponge or foam rubber. The composition may be selected to produce the finished bonding strip 6 of a hardness or resiliency as may be preferred, it being within the skill of rubber compounders to attain a product having almost any desired degree of porosity, resiliency, elasticity, etc.

After the bonding strip or member 6a is positioned as illustrated, the lining web 3 of suitable textile fabric or other material is stretched over the then top surface of the cushion members 1 and over the spaces between such members containing the uncured bonding elements 6a, this lining fabric 3 being preferably stretched fairly taut and anchored in a suitable manner as, for example, by being impaled on pins such as indicated at 10 provided on side members 11 which may be detachably mounted on side margins of the base plate 7. Dowel pins such as indicated at 12 may be employed for the purpose of removably mounting the members 11, these dowel pins being fixed in either the side members 11 or in the base plate 7 and freely insertable in and removable from the other part.

After the lining web 3 is in place, suitable heated bars 13 are brought down on the fabric 3 immediately above the bonding members 6a. These bars 13 may be of aluminum or other light weight metal and they may be heated by means of suitable electrical resistance members 14 positioned within the bars. The bars 13 have portions which are approximately of the same width as the space between the cushion members 1 and they are brought down sufficiently to squeeze the bonding material 6a between the fabrics 3 and 2. The composition of which the bonding member 6a is made is preferably such that it will more or less liquify at a temperature for example, around 130° which is below the scorching temperature of the fabrics 2 and 3. Hence, when the heater bars 13 are applied, the member 6a will liquify or be softened sufficiently to flow downwardly by gravity or under the pressure of the heater bars, so as to more or less embrace the inverted U-shaped portion 4a of the cover fabric 2 as indicated in Figure 4. This application of heat requires but little pressure since the cushions 1 are quite soft and easily compressible and the cushion members 1 will be easily compressed adjacent the zones of bonding to the very limited extent indicated in Figure 4. This compression of the cushions 1 occurs primarily at the edges of the cushions immediately adjacent the zone in which the heating bar is applied and does not involve any significant over-all compression of the cushion elements, wherefore but little compressive force need be applied by the heater bars. However, it appears preferable that at least light pressure be applied to thereby assist or induce the softened bonding strip to flow into conformity to the transverse shape of the recess enclosed between the cushion members and the covering and lining fabrics.

The heating bar remains in the position illustrated in Figure 4 for a time period which is sufficient to complete the curing or vulcanizing of the bonding strip 6 and when the bar is removed, the resiliency of the cushions 1 serves to re-expand the edge portions of the cushions and with them the bonding strip 6 so that said bonding strip will be somewhat elongated in the vertical direction as may be readily perceived by a comparison of Figures 4 and 5, the latter showing the finished condition of the bond which is also illustrated in the enlarged view of Figure 2. Incident to the expansion of the cushions 1, the edges of the cushions become more or less squared, very nearly returning to their original sharp-cornered condition as shown in Figure 3. Hence, on the inside or underside of the cushion, the joint between the cushion members 1 will be visible in the form of a narrow, shallow recess 15 which is fairly sharply defined. Also, incident to the vertical stretching of the bonding strip 6, there is a tendency for the cushion members 1 to be pulled toward each other so as to close up the recess between the sides 4, 4 of the cover material. This is entirely desirable and advantageous in that it improves the general appearance of the upholstery. The re-expansion of the cushion elements 1 and the stretching or tensioning of the bonding strip 6 cooperate to cause the fabrics 2 and 3 to be pulled taut over the surfaces of said cushion elements.

For forming the fabric 2 into conformity with the ribbed surface of the forming base 7, any suitable means may be employed; for example, as shown in Figure 6, forming bars 16 may be applied to the fabric 2 and pressed down between adjacent ribs 8 to correspondingly press the fabric 2 down into face-to-face engagement with the top surface of the forming base 7 or the fillers 9 thereon. There may be one of these forming members for each space so that when forming is started near the middle of the cover fabric as above suggested, the first former may be inserted and left in place to hold the fabric while the next formers are applied to the immediately adjacent spaces on opposite sides of the first inserted former. These formers 16 may be of a width substantially corresponding to the width of the cushions 1 and the extent to which they are insertable into spaces may be limited by providing formers with endwise extending lips 17 for engagement with vertically extending stop flanges such as 18 provided on the ends of the forming base 7. The stop means 17, 18 may be omitted but its employment is preferred to avoid a tendency to apply excessive pressure on the formers 16 and possible compacting of the fillers 9 if made of such convenient material as corrugated paper or other soft compressible material.

When the rubber bonding strip 6 is formed it comes into intimate contact with the edges of the adjacent cushions 1 and becomes in effect vulcanized to the cushions whereby the latter are effectively interconnected independently of the covering and lining fabrics so that the latter are not required to withstand forces which sometimes tend to pull the cushion members apart. The lining fabric 3 is preferably selected of such material as to have adequate strength and it is preferably of a fairly open weave so that the bonding strip 6 more or less penetrates the narrow zone 15 of the lining strip to thereby become most effectively bonded thereto. The cover fabric 2 may also be of fairly loose weave but nevertheless it is usually a closer or tighter weave than the lining fabric so that there is less tendency or likelihood for the liquified rubber to penetrate such covering fabric. The covering fabric, when entirely of textile material usually has a fairly coarse back to which the liquified rubber material can easily and effectively bond without significant penetration of the fabric. When the covering material is of leather, a normal or fabricated roughness or unfinished condition of the underside similarly lends itself to effective adhesion to the bonding strip. Imitation leather and similar fabrics usually have a cloth backing which likewise facilitates adhesion of the bonding strip thereto so that all of these types of fabrics may satisfactorily be employed for the covering fabric. Certain other types of sheeting, for example, some of the vinyl products may require special treatment or other kinds of bonding material to insure satisfactory adhesion.

In the event that the material of the bonding strip 6 should happen to partially penetrate the covering fabric and become visible on the outside of the covering fabric, the areas in which penetration will occur will be located in the tucked-in portions 4 and accordingly substantially concealed from view. The fabric backing 3 being under slight tension when secured to the cushion structure serves to provide a smooth, flat inner or bottom face for the cushion structure and it also aids the bonding strip 6 in preventing edgewise separation of the cushion members 1 and opening up of the tucks or plates 4.

It will be appreciated from the foregoing that the apparatus required for producing the described cushion structure is of very simple character and that there are no critical dimensions or temperatures involved so that operation of the equipment does not require any unusual skills. Because of the simplicity of the parts of cushion material and apparatus required for assembling them and bonding them together the structure is well adapted to production on small or relatively limited scales as well as on large volume scales.

While foam rubber has above been referred to as the preferred material for the cushion elements, this is not essential and other cushion materials may be employed. Suitable dimensionally stable cushion materials comprise, for example, foam rubber, sponge rubber, and certain other rubber or rubber-like preparations having the desired softness and resilience whereby the material resists permanent compacting and change of form or shape and instead, tends to restore itself from any compressed or distorted condition to predetermined shape and dimensions. All materials of this type are included within the designation "foam rubber" in the appended claims. The cushion, fabric, and bonding strip materials employed should be selected with due attention to their ability to meet the requirements of the described structure. Suitable special provision may be made if required to insure adherence of the bonding strip to the cushion and fabric members, as for example, the use of cements, solvents, or softeners on the edges of the cushion members 1 and on the fabrics.

In the example illustrated and described, the finished cushion, on its outside or wearing surface, has an elongated barred effect or design incident to the spaced tucks of the cover fabric but there are no visible nor readily engageable hard seams or joint zones. If desired, the tucks may be worked into various other designs, such as squares, diamonds and other shapes to attain an appearance to suit any given conditions, and also to facilitate the use of various sizes and shapes of the selected cushion material which may be most readily or advantageously available.

In the foregoing description, the bonding strip 6 was reactivated by heat to cause it to flow into the desired areas for bonding the cushion parts. However, I have found that the desirable results obtained in the manner above described can be even more advantageously obtained by the use of a bonding agent which requires no heat for the purposes above referred to. By avoiding the use of heat, difficulties of controlling the amount of heat, and its uniformity of application are avoided; also various dangers attending the use of heat, such as scorching of the upholstery fabric, personal injury by burning, and other serious dangers are avoided.

To obtain the desired results without the use of heat reactivated bonding material, I employ a rubber molding compound which embodies a high percentage of rubber, and vulcanizing, aging, and accelerator agents in a water linkage composition (not an emulsion) in which the water linkage may be broken by the application of pressure so that the composition changes quickly from a soft, mobile paste or putty-like condition to a fairly strong, resilient solid which will become stronger upon subsequent standing or aging for a few hours without continuing the application of pressure. As an incident to the destruction of the water linkage, by the application of pressure, the initially inactive aging, vulcanizing, and accelerator agents become active to produce a strong, vulcanized bonding strip. Only light pressure is required to disturb the water linked condition of the components and the time during which the pressure is applied may be as little as two or three minutes under some circumstances; twenty minutes is usually the maximum time required as a practical matter for the purposes of this invention. The rubber compound described is available on the market under the designation "Permapleat 61–1075" being a product of American Anode Division of the B. F. Goodrich Company, Akron, Ohio. Said bonding material is made by a process by which a greater concentration of rubber solids is obtained than is normally possible by conventional centrifuging and whereby the rubber particles are partially vulcanized but retained in a water linkage different from that which identified ordinary latex as an emulsion. Upon breaking the water linkage by the application of pressure, a change of state takes place, the partially cured rubber particles becoming joined and knitted together into a solid resilient bonding structure.

One way of using the described pressure sensitive rubber molding composition in connection with the preparation of a padded upholstery construction is represented in Figures 8 to 11 inclusive.

In Figure 8, a die structure 19 corresponds generally to the die structure illustrated in Figure 3 except that the design formers 8a are mounted on the base 7a by being recessed into the same.

The selected upholstery fabric 20, precut to the required size, is placed over the top of the die and according to one procedure is anchored on the anchoring pins 10a at the left hand end of the die. The fabric is then pressed into the cell or chamber 21 (Fig. 7) of the die by means of a suitable former 22 which has a handle 23 for facilitating manipulation of the former. This former may be an open, picture-frame-like member and it is used to press the cover fabric into said die cavity 21 to work the fabric into the corners of the cavity. A thin bladed tool 24 which will fit between the edges of the former 22 and the design forming bars 8a, may also be employed if desired, to work the fabric into close conformity to the corners of the cavity and to adjust the lay of the fabric as required. To maintain the fabric in place in the cavity 21, the former 22 is preferably permitted to remain in the cavity over the fabric as shown in Fig. 8 while another similar former is employed to similarly work the fabric into the adjacent cavity 24 (Fig. 7). This operation is repeated with the successive pairs of cavities in the die until all of the cavities are properly lined with the upholstery fabric. The fabric element is, of course, selected of such size that when it is worked into place, a margin will remain in overlying relation to the peripheral portion of the die structure for impalement on the anchoring pins such as 10a. The open picture-frame type of former is not necessary but it is advantageous in that it permits visual inspection of the lay of the fabric on the bottom of the die cavity.

The next steps are to carefully remove the formers 22 from the fabric lined cavities without disturbing the lining fabric, and then to insert suitable cushion elements 1a which again may be of foam rubber or equivalent material and preferably but not necessarily of thickness which is greater than the depth of the die cavities. The cushion blocks or pads 1a may, as shown in Figure 9, be a free fit in the lined cavities, but for certain purposes they may be made a tight fit, so tight that the cushion blocks will be somewhat compressed between the surrounding forming bars 8a. With loose fitting cushion elements positioned in the fabric lined die, the described pressure sensitive bonding composition is extruded from a suitable tube or device and delivered in the form of a round, oval, flat or other shaped strip or ribbon 25 into position overlying the cloth covered upper edges of the forming bars 8a and intermediate the cushion members 1a. Because of the soft mobile state of the pressure sensitive rubber composition, the oval or other shaped ribbons will tend to flow down between the cloth covered sides of the forming bars 8a and the respectively adjacent cushion edges to a condition such as typified at 25a in Figure 10. Depending upon the amount of space between the cushion edges and the cloth covered bars, the rubber composition will penetrate more or less between the cushion edges and the adjacent portions of the upholstery cloth.

Pressure is next applied to the bonding composition 25 and to the pads 1a substantially as represented in Figure 11. Pressure is applied by means of a compressible cushion blanket 26 which overlies the entire top surface of the die structure and is carried by a rigid plywood or other backing 27. Said backing 27 may be suitably stiffened by reinforcing bars (not shown) across its top surface so that uniform pressure may be applied to the upholstery structure through the agency of said compressing cushion 26. The compressing cushion 26 may be a sheet of foam rubber of suitable thickness or its equivalent.

In some cases suitable fabric tape strips such as represented at 28 may be placed in overlying relation to the forming bars 8a and the bonding ribbons thereon and, whether or not such fabric tape strips are employed, it is preferable that an absorbent tissue sheet 29 be placed over the die supported cushion structure so as to prevent direct contact and attaching of the bonding composition to the pressure pad 26.

The pressure pad 26 is brought down on the die supported cushion structure to a condition such as represented in Figure 11 in which the thickness of the upholstery cushions 1a is substantially compressed (in this instance to about two-third of their initial thicknesses), the compressing pad 26 being, of course, also compressed in the process. During such compression, the bonding composition ribbons 25 are pressed down against the upholstery fabric overlying the top edge of the forming bar 8a, and the normal effort of the compressing pad 26 to conform to the rigid underlying structure results in the production of lateral pressure as indicated by the arrows 30 to force some of the bonding material downwardly between the cloth covered faces of the forming bar and the adjacent edges of the cushions 1a. The pressure exerted on the cushions 1a also tends to effect lateral expansion thereof so that lateral pressure forces are developed as indicated by the arrows 31 which cooperate with the lateral forces 30 to cause intimate engagement of the legs 32a of the bonding material with the cushion edge portions and the upholstery cloth which embrace said leg portions.

It will be seen that the bonding material in the illustrated example is caused to wrap around, i.e., flow into a U-shape around the cloth covered upper portion of the forming bar 8a. The legs 32 of the pressure-formed U-shaped bonding material strip extend downwardly for a substantial proportion of the normal thickness of the pads 1a, in this instance nearly one-half of said normal thickness. The depth to which the bonding material penetrates between the pad edges and the cloth covered bars may easily be controlled by appropriate control of the fluidity of the bonding material, the freeness or tightness of fit of the pads 1a in the die cavity, the pressure applied, and perhaps other factors. As reformed, said bonding material strip also includes a bottom web portion 32b and lateral wings 32c, the bottom web interconnecting the adjacent portions of the fabrics 20 and 28 and the wings interconnecting the adjacent portions of the backing fabrics and marginal portions of the pads 1a.

In the case of a cushion structure in which the pads 1a are about one inch in normal thickness the compression pressure applied as above described may advantageously be held for about four minutes after which the compression pad 26 may be removed the cushion structure found bonded strongly enough to permit removal of the structure as an integrated unit from the forming die. This time period may be varied considerably and as above indicated may be within the range of from 2 to 20 minutes in most upholstery making methods according to this invention.

The removed structure may be placed aside on a suitable storage rack or surface for a sufficient period of time to permit complete setting or curing of the bonding material before the cushion structure is applied to an article of furniture. The setting time required after removal of the pressure will also vary somewhat in accordance with the specific composition of the bonding agent, the amount employed and the time period during which pressure was held on the structure. Instead of the foam rubber compression pad 26, an inflated pressure bag may be used; such bag, and also the pad 26, may be provided with any suitable face covering or treatment to which the bonding material will not adhere, but the use of the absorbent tissue blanket 29 for keeping the compression pad clean, is very satisfactory.

It is characteristic of the bonding material that within a short period of pressure it will be converted from a nearly fluid state to a solid but resilient state so that the upholstery unit may be removed from the forming die and placed on an aging rack or the like without impairing the bond effected incident to the pressure cycle. After an aging period of about two hours, the bonding material and its bond to the pads 1a and covering fabric 20 and backing fabric or strips 28, will be sufficiently cured or vulcanized and made strong enough (incident to the action of the aging, vulcanizing and accelerating agents included in the composition) to permit application of the upholstery unit to an article of furniture. Aging for a two-hour period is often sufficient but in many instances, depending largely on variable factors, it is preferred that aging be permitted to continue for a period of from 8 to 24 hours or for any period within the range of 2 to 24 hours before subjecting the upholstery unit to the handling and stresses incident to its application to an article of furniture.

As shown in Figure 12, when the upholstery unit is completed, corner portions of the cushions 1a will remain under at least some compression incident to the bonds made to the adjacent portions of the upholstery cloth while the cushions 1a are under compression. The U-shaped bonding strip 25 remains resilient but is nevertheless sufficiently stable that it provides a permanent design formation in the upholstery fabric 20. For purposes of inspection I have torn the foam rubber pads 1a out of a unit of upholstery made as described in connection with Figures 8 to 11 and have found that the foam rubber cushions 1a tear so as to leave a strip or pieces of the foam rubber cushions adhered to the legs of the U-shaped bonding strip 25 rather than separate from said strip by breaking the bond with it. After carefully removing such adhering strips or chunks of foam rubber from the bonding strip 25, the latter remained in U-shape form and continued to hold the fabric 20 in the recessed or tucked condition in which it is shown in Figure 12 for the full depth of the legs of said bonding strip, thereby demonstrating the permanent, built-in character of the design provided by the described bond construction.

The absorbent tissue paper blanket 29 serves to prevent the bonding composition from adhering to the compressing pad 26 and said absorbent paper blanket also tends to absorb moisture which is expressed or released from the bonding composition incident to the application of pressure through the agency of said compression pad 26. Hence, the pad 26 is kept clean and available for repeated use without costly cleaning operations. The paper blanket may adhere to the cushion structure and may remain on the back thereof or it may be removed if preferred. In the event that portions of the paper in the areas of bonding agent do not separate therefrom, such portions may be permitted to remain and are generally unobjectionable. Under some circumstances, such as when the covering fabric 20 is a very porous fabric, the bonding material may penetrate the fabric and appear on its outside surface. It is characteristic of the material that it may be rubbed off in crumbles if rubbing is done soon after the removal of the upholstery from the compressing apparatus and before setting if the bonding material has progressed too far. Hence, especially when very porous covering fabric is used, inspection of the constructions upon removal from the compressing apparatus is advisable in order to detect the need for removal of bonding material from the outside of the construction as described.

As shown in Figure 13, an upholstery unit is constructed according to the method shown in Figures 8 to 11 inclusive to include fabric tape elements 28 on the back of the cushion structure overlying the bonding strips. These tapes are, of course, as effectively bonded to the cushion structure through the agency of the bonding strip as is the cover fabric 20. These strips are usually extended somewhat beyond the edges of the finished cushion as indicated at 28a to provide tacking tabs which may be used for tacking or otherwise attaching the cushion as indicated at 28b to the frame of an article of furniture. These tapes being securely bonded to the construction, constitute a strong flexible grid which supports the construction and which serves as a shock and load bearing medium. Where the article of furniture is provided with an underpad, the back tapes 28 of the cushion structure may advantageously be employed under tension to effect compression of the underpad 33 as represented in Figure 14, the tapes being tacked or otherwise secured at their opposite ends to the frame of the article under such tension so as to maintain the condition illustrated. When desired, and when the frame of the article of furniture permits, the tape reinforced regions of the cushion construction may be tacked as indicated at 28c to the frame at selected points along the lengths of said tape reinforced regions. This arrangement develops a crowned face as indicated at 34 on the front or outer surface of each pad unit of the cushion, this often being a desirable design feature. The embedment of the tape strips and adjacent portions of the cushion construction in the underpad 33 serves to prevent lateral sliding or shifting of the material in the underpad 33 and bunching of the underpad material, so that uniform distribution of the material in the pad 33 is effectively maintained.

In some instances, especially when the compressible pad units are made a tight fit in the die cavities, the bonding material may be applied to the fabric portion supported by the forming bars 8a before the cushions are inserted. This is represented in Figure 15 where a collapsible tube 35 of the described bonding material is shown equipped with a nozzle or spreader 36 which is formed to embrace the upper portion of the cloth covered forming bar 8a so that bonding material discharged from said tube (or other supply source) may be formed into a U-shaped ribbon 37 around said upper portion of said cloth covered forming bar as illustrated. The spreader 36 may be so shaped that the depth of the side legs of the U-shaped layer of bonding material may be varied by merely adjusting the angle at which the nozzle or spreader is held while it is moved along the top of the cloth covered forming bar to apply the bonding material as illustrated. After the bonding agent has been applied in this manner, oversize cushions 1a may be inserted. Such pads are preferably inserted by initially inversely cupping the pads so that they may be tucked into the die cavities without excessive movement of the pad edges across the adhesive coatings on the cloth covered sides of the forming bars 8a. When the cushions are inserted substantially to the full depth of the cavities they may be permitted or forced to flatten out and spread laterally whereby the side edges of the cushions will be brought into pressure engagement with the bonding material on the sides of the cloth tucks around the forming bar; thereafter, the procedure described in connection with Figures 8 to 11 may be followed to apply further pressure to convert the bonding material from the highly mobile state to the solid resilient condition already referred to.

In the last described procedure, the application of pressure by means of the compression pressure pad 26 is not relied upon to form the bonding material into U-shaped form around the cloth covered forming bars 8a but said pressure does serve the primary purpose of converting the bonding material into a stable strip fully capable of serving the purposes already explained. If the cushion pads 1a are made large enough in either of the described methods, they will, upon removal in the form of a unit of upholstery, tend to bulge out of the plane of the unit and this tendency to bulge is normally directed by underlying padding to cause the front of the cushion to exhibit a crowned effect in each of its tuck or flute bonded areas.

As shown in Figure 16, the nozzle or spreader 36a for applying the bonding material is formed to apply the material only to the cloth covered top and one side of the cloth covered forming bar 8a. This arrangement is especially useful on the forming bars which form the outside walls of the various die cavities. The nozzle or spreader may, of course, be of any preferred shape to provide the oval ribbons 25 of bonding material (Figure 9), flat ribbons, angle, channel, or other preferred shapes.

In Figure 17 there are illustrated a forming die and pressure applying arrangement similar to that shown in Figures 10 and 11 but the design forming bar 8b is of downwardly tapered cross section. In the example illustrated, the taper of the bar is relatively slight so that the side portions of the spreader will freely pass the thickest portion of the bar 8b incident to the sizing of the spreader to provide the desired clearance for forming the inverted U-shaped coating 37a of bonding material. However, if a more sharply tapered bar is used, said nozzle may be made of metal or plastic material which is normally stable but which is sufficiently resilient to permit the sides of the spreader to be flexed apart to permit positioning of the spreader around the upper portion of the cloth covered bar if the taper of the bar requires such separation. When the cushion structure is formed around tapered design bars such as 8b with oversized cushions the finished product will appear as represented in Figure 18 with the flute 38 between the cushions more or less closed as indicated at 38a at the outer or front face of the cushion.

While the use of foam rubber cushion pads is highly desirable and represents the best practice according to the invention, it is not essential that the pads be of compressible rubber construction. For example, as shown in Figure 19, the pads may comprise a main body layer 39 of curled hair and a top surfacing layer 40 of cotton. The curled hair layer may be supported by an open mesh textile fabric net 41 (for example, about 6 x 6 mesh). These net-backed two-layer pads are assembled with the selected upholstery fabric 42 in a design forming die in the same manner as described above in connection with foam rubber cushions. A suitable ribbon of rubber bonding material may then be applied in the manner already explained and a lining strip 42 placed in position so that after the described pressure treatment and removal of the upholstery structure from the die the structure will appear as shown in Figure 19. A particularly strong bond between the cushion elements will be obtained if a thin film 43 of the bonding material is applied to the inside face of the strip 42 so as to cause the strip 42 to become bonded not only to the tucked-in portion of the cover fabric 42 but also to the overlying margins of the supporting nets 41 of the adjacent cushions. Some of the curled hair in the pads 39 becomes embedded in side bead or leg portions of the bond material strip which results from the application of pressure as already explained.

In Figure 20 there is represented an upholstery cushion in which the pad units comprise a main body layer 44 of curled hair and an upper surfacing layer 45 of foam rubber. Such pads are assembled in the manner already described with upholstery fabric 42 and bonding is effected by means of a comparatively large amount of the bonding material applied to cause the formation of side beads 46, 46 of large size joined by a web 47 around the lower portion of the tucked-in fabric 42. A backing or lining strip 48 is also preferably although not necessarily provided. In this arrangement the larger bonding material beads 46 provide extensive and numerous contacts between portions of the curled hair pads and the bonding material strip to produce a strong connection between the adjacent pads. In this arrangement a backing sheet or net such as the net 41 in Figure 19 may be used or omitted as preferred.

A special design which is quite practicable is shown in Figure 21 wherein foam rubber cushions 49, 49 are spaced apart a considerable distance and interconnected primarily by means of a bottom or backing strip 50 which is bonded by the described bonding material applied to the strip 50 in the form of a pair of thin ribbons 51, 51 for respectively cushions 49, 49. The ribbons 51 of bonding material also extend under a cotton or other intermediate pad or strip 52 so as to effect bonding of such strip to the backing strip 50. The side edges of the cushions 49 are also coated as indicated at 53 with the bonding material so as to securely bond edge covering portions 42a of the cover fabric to the edges of the pads 49. Portions of the said covering material indicated at 42b are also pressed into contact with the bonding material ribbons 51 to aid in holding the central portion 42c of the cover fabric in such relation to the backing strip 50 as to maintain the filler pad 52 under a suitable degree of compression. It will be understood that compression of the thickness of the rubber cushions 49 may be effected to cause the application of the desired pressure to the bonding agent coatings 51, 53 to cause the same to quickly set up in the manner already explained, suitable provision being also made to simultaneously apply pressure to the intermediate pad strip elements to insure preliminary quick setting of the bonding material in the area of said intermediate strip.

Many variations in the design or pattern of upholstery material constructed in the manner described are possible as represented by the various forms of tuck or flute which may be produced between cushions, and also by changes in the shape of the cushion units. Instead of square or rectangular units such as required by the die structure shown in Figure 7, diamond shapes, various round or other curved shapes may be provided. Regardless of the shapes employed, the application of pressure for the purpose described is easily accomplished incident to the use of the described over-all compression pad arrangement for applying the desired pressure.

The described pressure sensitive bonding material effectively accomplishes the purposes of the first described heat vulcanized bonding material but at much less cost in respect of both equipment required and time required for fabrication purposes.

Various other advantages and benefits of the structure may be observed and various modifications may be made in the described cushion structure and apparatus while retaining the principles of the described structure and apparatus.

I claim:

1. An upholstering cushion comprising a pair of relatively independent, substantially uncompressed resilient pads assembled in coplanar relationship with mutually adjacent edges thereof in predetermined spaced relation to each other, covering fabric overlying a face of said assemblage and having portions tucked between said edges of said pads, and a flexible, substantially uncompressed resilient rubber composition bonding strip of U-shaped cross-section contacting substantially only said tucked-in portions of said fabric, said strip having thin flexible legs embracing said tucked in fabric with the legs of said U-shaped strip interposed between said tucked in fabric and the respective pad edges, substantially the entire areas of interengagement of said tucked in fabric, said bonding strip, and said pad edges being adhered to each other, the U-shaped form of said bonding strip serving to provide adequate bonding area between said parts to durably integrate the same into a unitary cushion structure and the thinness of the legs of said bonding strip serving to impart to said legs such flexibility and softness as to permit free flexing thereof incident to compression of said cushions whereby the presence of said bonding strip as a unit in the structure is minimized.

2. An upholstery cushion comprising a pair of relatively independent, substantially uncompressed foam rubber pads in coplanar relationship with mutually adjacent edges thereof in predetermined juxtaposition, the portions of said pads adjacent to said edges being of substantial thickness and said adjacent edges being substantially normal to the faces of the pads, covering fabric overlying one side of said coplanar pads and having a portion tucked into U-shape between said edges of said pads, a substantially uncompressed resilient rubber composition bonding strip of U-shaped cross-section contacting substantially only said tucked-in portion of said fabric, said strip embracing said tucked in fabric with the legs of said U-shaped strip interposed between said tucked in fabric and the respective pad edges, substantially the entire areas of interengagement of said tucked in fabric with said bonding strip, and of said bonding strip with said pad edges being adhered to each other, the thickness of said pad portions of said pads and the depth of the tucked in fabric between said pads, and the disposition of said pad edges normal to the faces of the pads cooperating to form sharply defined deep flutes in cushion intermediate said pads.

3. An upholstering cushion comprising a pair of relatively independent, substantially uncompressed resilient foam rubber pads assembled in coplanar relationship with mutually adjacent edges thereof in predetermined juxtaposition, at least marginal portions of said pads contiguous to the mutually adjacent pad edges being of a substantial thickness which is greater than the space between said pads, covering fabric overlying a face of the assemblage and having a portion tucked into U-shape between said edges of said pads with at least the upper portions of the legs of the tucked in fabric spaced from each other approximately in conformity with the spacing of said pads so as to present a sharply defined, deep flute on the fabric covered face of the cushion, and a flexible, resilient, substantially uncompressed rubber composition bonding strip of U-shaped cross-section engaging said fabric substantially only in said tucked-in portion and adhered to at least the lower portion of said tucked in fabric in embracing relation thereto and engaging and adhered to the respectively adjacent pad edges, substantially the entire areas of interengagement of said tucked in fabric with said bonding strip and of said bonding strip with said pad edges being adhered to each other, the U-shaped form of said bonding strip serving to provide adequate bonding area between said parts to durably integrate the same into a unitary cushion structure having sharply defined, deep flute therein.

4. An upholstering cushion comprising a pair of relatively independent, substantially uncompressed resilient, pads disposed in substantially coplanar, spaced edge-to-edge relationship, the portions of said pads contiguous to the mutually adjacent edges thereof being of substantial thickness, a covering fabric overlying a face of said assemblage and having a portion tucked into the space between said mutually adjacent edges of said pads, a flexible, substantially uncompressed bonding strip interposed between said edges below said tucked-in covering fabric portion and adhered only to said edges and to said tucked-in covering fabric, said bonding strip being stabilized and adhered to said pad edges and fabric while adjacent marginal portions of said pads are compressed and the pad edges thereby maintained in intimate engagement with said tucked-in fabric and said bonding strip, whereby, upon release of said compression and expansion of said edge portions, said covering fabric is drawn taut across said edges and face of the cushion.

5. An upholstering cushion comprising a pair of relatively independent, substantially uncompressed, resilient pads disposed in substantially coplanar, spaced edge-to-edge relationship, the portions of said pads contiguous to the mutually adjacent edges thereof being of substantial thickness, covering and lining fabrics overlying the opposite faces of said pads, a flexible, substantially uncompressed bonding strip intermediate said mutually adjacent edges and adhered thereto and to the underlying portion of said lining fabric, said bonding strip being recessed from the covering fabric face of said pads and said covering fabric having a portion thereof extending into the space between said pads and also adhered to said bonding strip, said bonding strip contacting said covering fabric substantially only in said space, the adherence of said bonding strip to said resilient pad edges and to said covering and lining fabrics being effected while the adjacent edge portions of said pads are compressed to a reduced thickness, whereby upon release of said compression and said edge portions, said bonding strip is urged to move away from said covering fabric face of the pads and said covering fabric is drawn into said space and thereby tautened over the surface of the cushion.

6. An upholstering cushion comprising a pair of relatively independent, substantially uncompressed, resilient foam rubber pads disposed in substantially coplanar, spaced edge-to-edge relationship, the portions of said pads contiguous to the mutually adjacent edges thereof being of substantial thickness, a flexible, substantially uncompressed bonding strip of U-shaped cross-section interposed between said pads with the legs of said U-shaped strip respectively adhered to portions of the adjacent edges of said pads, and a covering fabric overlying a face of said assembled pads and having a portion tucked into the space between the same and between the legs of said U-shaped bonding strip, said bonding strip being adhered also to substantially only that portion of said covering fabric which is tucked between said legs as aforesaid, said adherence to said resilient pad edges being effected with the adjacent edge portions of said pads compressed to a reduced thickness whereby, upon release of said compression and expansion of said edge portions, said bonding strip is urged to move away from the fabric covered face of the pads and said covering fabric is drawn into said space and thereby tautened over the surface of the cushion.

7. An upholstery combination comprising preshaped resilient, substantially uncompressed pads assembled in coplanar relationship with their edges in a predetermined spaced relation to each other, said pads being of substantial thickness and having their mutually adjacent edges approximately normal to their faces, covering fabric extending over a face of said pad assemblage and having a portion which enters the space between said pad edges in face-to-face relation to the adjacent pad edges and which spans said space adjacent the bottom face of said assemblage, and stable, substantially uncompressed, resilient bonding material intermediate said pads and contacting and adhered substantially only to the edges thereof and to the portions of said covering fabric which are in face-to-face relation to said edges as aforesaid, and to said covering fabric portion which spans said space.

8. An upholstery combination comprising preshaped substantially uncompressed resilient pads assembled in coplanar relationship with their edges in a predetermined spaced relation to each other, said pads being of substantial thickness and having their mutually adjacent edges approximately normal to their faces, covering fabric extending over a face of said pad assemblage and having a portion which enters the space between said pad edges in face-to-face relation to the adjacent pad edges and which spans said space adjacent the bottom face of said assemblage, a backing member underlying the space between said pads and at least the adjacent marginal portions thereof, and stable, substantially uncompressed resilient bonding material intermediate said pads and contacting and adhered only to the edges thereof and to the portions of said covering fabric which are in face-to-face relation to said edges as aforesaid, to said covering fabric and backing member portions which span said space, and to the marginal portions of said pads and the underlying portions of said backing member.

References Cited in the file of this patent

UNITED STATES PATENTS

| | | |
|---|---|---|
| 2,322,226 | Cunnington | June 22, 1943 |
| 2,341,978 | Cunnington | Feb. 15, 1944 |
| 2,434,527 | Untiedt | June 13, 1948 |